H. C. L. VON PHILP, DEC'D.
A. M. C. VON PHILP, ADMINISTRATRIX.
WHEEL ROLLING MILL.
APPLICATION FILED JAN. 30, 1919.

1,371,009.

Patented Mar. 8, 1921.
5 SHEETS—SHEET 1.

H. C. L. VON PHILP, DEC'D.
A. M. C. VON PHILP, ADMINISTRATRIX.
WHEEL ROLLING MILL.
APPLICATION FILED JAN. 30, 1919.

1,371,009.

Patented Mar. 8, 1921.
5 SHEETS—SHEET 5.

UNITED STATES PATENT OFFICE.

HJALMAR CASIMIR LUIGI von PHILP, DECEASED, LATE OF BETHLEHEM, PENNSYLVANIA, BY ALVA MARIA CAROLINA von PHILP, ADMINISTRATRIX, OF BETHLEHEM, PENNSYLVANIA.

WHEEL-ROLLING MILL.

1,371,009.  Specification of Letters Patent.  Patented Mar. 8, 1921.

Application filed January 30, 1919. Serial No. 273,978.

*To all whom it may concern:*

Be it known that HJALMAR CASIMIR LUIGI VON PHILP, deceased, late a citizen of the United States, and resident of Bethlehem, Penn., did invent certain new and useful Improvements in Wheel-Rolling Mills, of which the following is a specification.

This invention relates to rolling mills and more particularly to a rolling mill adapted for rolling car wheels, gear blanks, etc., into the proper shape, more especially such articles as have a rotative movement during operation.

The invention has for an object to provide a rolling mill of the type referred to distinguished by easy adjustment in all desired directions of the various instrumentalities operating on the object being rolled.

A further object is the provision of a simple means for causing a relatively slow and fast advancing and receding movements respectively of such instrumentalities.

A still further object is the provision of safety devices to prevent overload on the various instrumentalities due to a too rapid feed thereof or to high spots or inequalities in the object being rolled.

For further comprehension of the invention, and of the objects and advantages thereof, reference will be had to the following description, taken in connection with the accompanying drawings in which I have illustrated a preferred embodiment of the invention in a wheel rolling mill. The various arrangements, constructions and combinations of parts comprising the novel features of the invention are more particularly set forth in the appended claims.

In the drawings, like parts in the several views have been given the same reference numeral.

Briefly stated, the wheel rolling mill as here shown may be said to comprise a pair of center supports adapted to engage in the usual central aperture of the wheel to support the latter, a series of side rolls adapted to engage and shape the sides of the rim, a pair of web rolls adapted to shape the web of the wheel and a tread roll adapted to shape the tread of the wheel, with suitable means for advancing these various devices toward and away from the wheel blank and for rotating the web rolls from which latter rotative movement is imparted to the blank.

Figure 1:
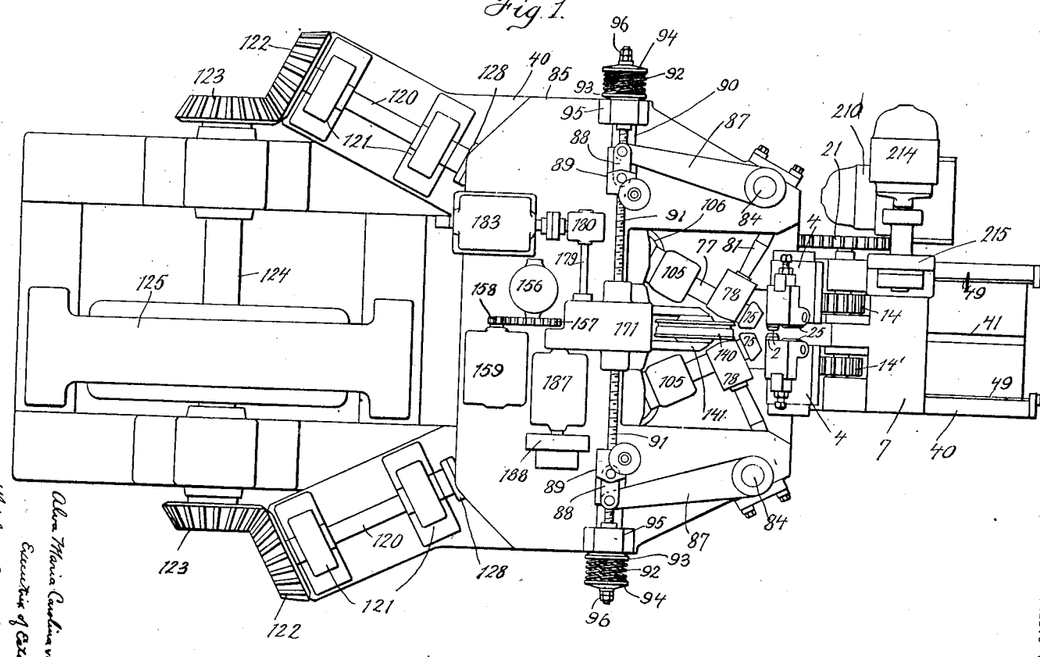
Figure 1 is a plan view of a wheel rolling mill embodying the invention.

As here shown the center supports consist of a pair of co-axially disposed pins 2 of truncated conical form located adjacent one another on opposite sides of the median line of the mill and pointing inwardly. These pins are located toward the right hand end of the mill as seen in Fig. 1 and are fixed on brackets 3 suitably secured to carriages 4 located one on each side of the mill and adapted to have movement transversely of the mill toward and away from one another. To this end the carriages are provided with the grooves 5 in which engage the transverse tongues 6 formed on a base 7 to which further reference will be made, these tongue and groove connections providing guides for the carriages in their movement toward and away from one another.

Movement is imparted to the carriages 4 by screws 10, these screws being freely supported in the base 7 and threaded through the gears 12 which mesh with idler gears 13 journaled in the base 7, these idler gears in turn meshing with a second pair of gears 14 and 14'. These screws pass freely through webs 15 formed integral with the base 7 and are provided on their outer ends with heads 16 between which and the webs 15 spring washers 17 bear. The gear 14 is fixed to a shaft 20 journaled in the base 7 and having a large driving gear 21 fixed on the outer end thereof. A driving connection is effected between the gear 14 and the gear 14' by means of a pair of idler gears 22 and 22' (Fig. 4) journaled in the base 7 below the gears 14 and 14' and which mesh with the latter gears and also with a pair of gears 23 and 23' on a countershaft 24 suitably journaled in the lower part of the base 7. It will be apparent that the screws 10 are both rotated from the driving gear 21.

The carriages 4 also have mounted thereon the rolls 25 for forming the sides of the wheel rims. There are four of these rolls provided in the present embodiment of the invention and comprising an upper pair and a lower pair.

Figure 4:
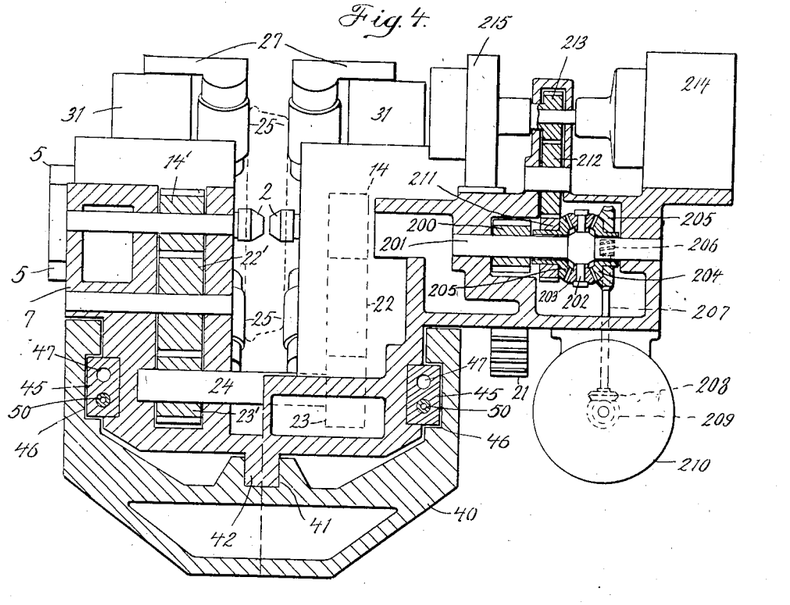
Fig. 4 is an enlarged transverse vertical section the left hand portion of which is taken on the line 4—4 of Fig. 3 and the right hand portion on the line 4ª—4ª of Fig. 3.
Figure 5:
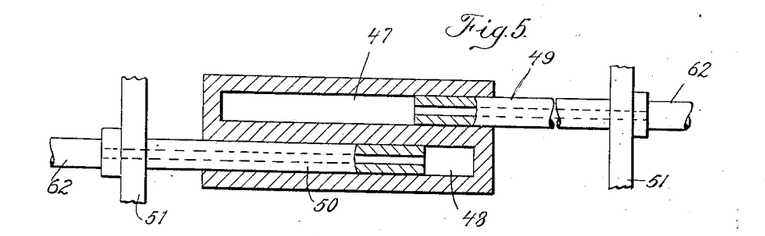
Fig. 5 is a longitudinal vertical section of the hydraulic device for moving the base carriage.

These rolls are all arranged with their axes radially of the center supports 2, the rolls of each pair being arranged in juxtaposition so as to bear on directly opposing portions of the wheel rim. These rolls are mounted to rotate freely in a series of brackets 27, each of like construction and mounted on the carriages 4 to have slight transverse adjustment to secure proper alinement, by means of headed bolts 28 passing through slots 29 in the brackets and screwed into the carriage. Abutment screws 30, threaded through lugs 31 on the carriages 4, bear against the rear of the brackets to receive the thrust of the rollers. The power mechanism for moving the carriages 4 toward and away from one another is also mounted on the base 7 and will be referred to later. This base 7 is itself a carriage movable longitudinally of the mill on the main base, or bed plate, 40 of the latter, the portion of the main base in which the carriage 7 is mounted being of channel shape in cross section as shown in Fig. 4 to receive and guide the carriage and having a central groove 41 receiving a tongue 42 on the bottom of the carriage.

Figure 6:
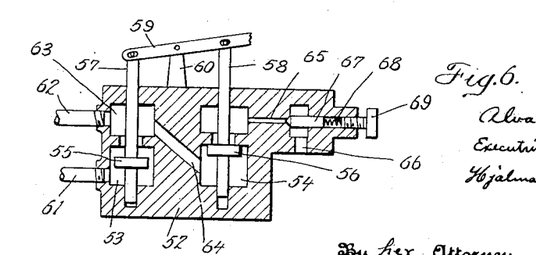
Fig. 6 is a section of the valve for controlling the hydraulic device.
Figure 7:
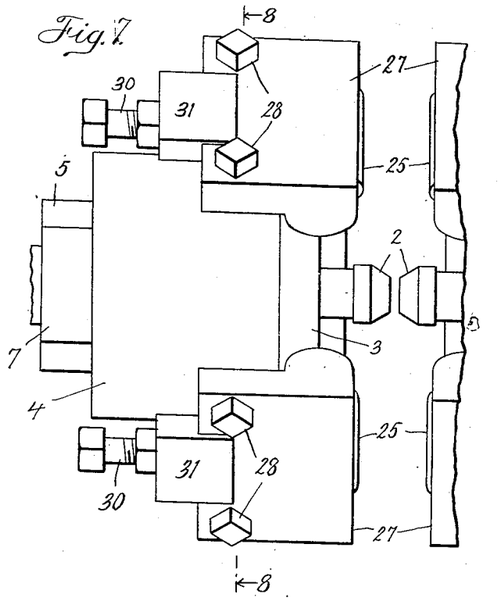
Fig. 7 is a front view of the carriage supporting the rim rolls and supporting pins.
Figures 8, 11:
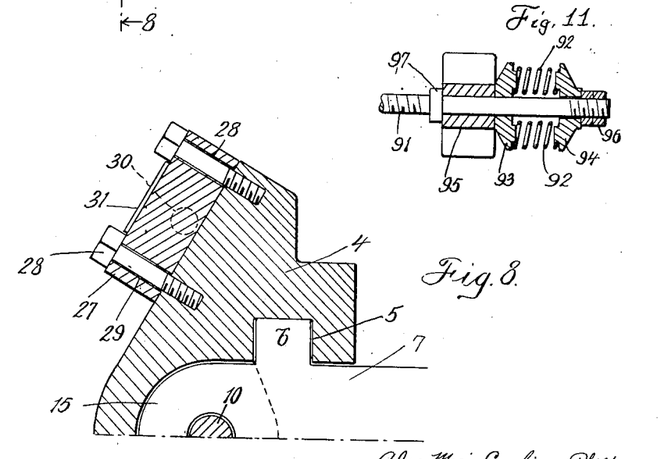
Fig. 8 is a detail transverse section on the line 8—8 of Fig. 7.
Fig. 11 is a detail sectional view of the spring relief device on the feed screw of the web roll.
Figure 9:
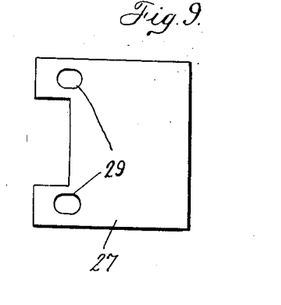
Fig. 9 is a detail face view of one of the roll holding brackets.
Figure 10:
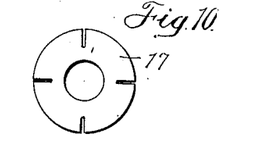
Fig. 10 is a detail face view of the spring washer on the feed screw of the center pin and rim roll carriage.

The carriage is moved longitudinally on the base 40 by hydraulic means comprising a pair of cylinder blocks 45 one on each side of the machine which are fastened to the carriage 7 to move therewith and extend horizontally along the sides of the latter, the base 40 being grooved as at 46 to accommodate the blocks. Each of these blocks has a pair of cylinder borings, 47 and 48 respectively, into which extend. from opposite ends of the cylinder block, the hollow plungers 49 and 50 which are rigidly secured at their outer ends to portions 51 of the main base. The fluid supply to these cylinders is controlled by a valve (Fig. 6) consisting of a casing 52 having a pair of chambers 53 and 54 for supply and exhaust valves 55 and 56 whose stems 57 and 58 are connected to a rocking lever 59 fulcrumed on a lug 60 on the casing 52. A pipe 61 from the pump leads into valve chamber 53 while a pipe 62, which may be suitably branched to opposite sides of the mill leads from a passage 63, controlled by valve 55, to one pair or cylinders. From this latter passage a conduit 64 leads to the valve chamber 54, the liquid exhausting through a diminished passage 65 leading to the exhaust opening 66 and controlled by a valve 67 pressed to its seat by a spring 68 whose pressure may be regulated by a screw 69 against which the screw bears.

There are a pair of these valve controls, one for the carriage advancing cylinders and one for the carriage retracting cylinders, the spring valve 67 being supplied only to the exhaust of the control for the carriage advancing cylinders, the two valves being otherwise similar. The pipes communicate with the outer ends of the hollow plungers 49 and 50.

The web forming rolls 75 are located in juxtaposition on opposite sides of the central vertical plane of the mill and with their axes in a horizontal plane co-incident with the axes of the center supports 2, from which latter the web rolls are spaced a short distance.

The axes of these web rolls incline toward one another while the rolls themselves are of truncated conical form and so arranged as to have their contiguous portions parallel to each other and to the central vertical plane of the machine, this arrangement producing an approximately uniform rate of speed of the rolls and the portions of the web of the wheel engaged thereby as will be apparent, and reducing rubbing or lost motion between all portions of such surfaces to a minimum.

These web rolls are fixed on the ends of a pair of horizontal shafts carried by the main base 40 of the mill and inclined toward one another, the construction and method of mounting of each shaft being similar. Each shaft is divided longitudinally into a series of sections, as will be pointed out later, the forward section 77 having fixed thereto the corresponding web roll. To provide for moving the web rolls toward and away from one another each shaft section 77 is supported adjacent the web roll by a slidable bearing 78 fixed on an arcuate slide 79 guided in arcuate guides 80 on the main base. A link 81 is secured to the bearing 78 at one end by a ball and socket connection 82 and is pivoted at its other end to the end of the crank 83 formed on a vertical shaft 84 supported at its lower end in the base 40 and at its upper end in a top plate 85 secured at a distance above the main base on the posts 86. The upper end of each shaft 84 extends above the top plate 85 and has fixed thereto an arm 87 whose other end is pivoted to a link 88 pivoted in turn on a carriage 89 guided on the transversely extending dovetail guide 90 on the top plate 85. The carriages 89 are moved along the guide 90 by the screws 91 supported on and extending transversely of the top plate 85 and engaging in a suitable tapped boring in the carriage 89.

It will be obvious that rotating of screws 91 will cause the web rolls to be moved inwardly or outwardly. To enable the web rolls to yield if encountering high places or any obstruction on the blank which would be liable to damage the mill, the screws 91 are supported in bearings in a manner to move axially when such obstructions are encountered. To this end each screw is held yieldingly pressed outward to its normal position by a cluster of expansile springs 92 which are grouped around the outer end of the screw. These springs are contained, between a pair of caps 93 and 94 carried by the screw and rotatable therewith, the cap 93 being interposed between the outer bearing 95 and the springs while the cap 94 is adjustably held on the end of the screw 91 by the nuts 96. A fixed collar 97 is provided on the screw 91 adjacent the inner face of the bearing 95 to take the outward thrust of the springs.

Figure 2:
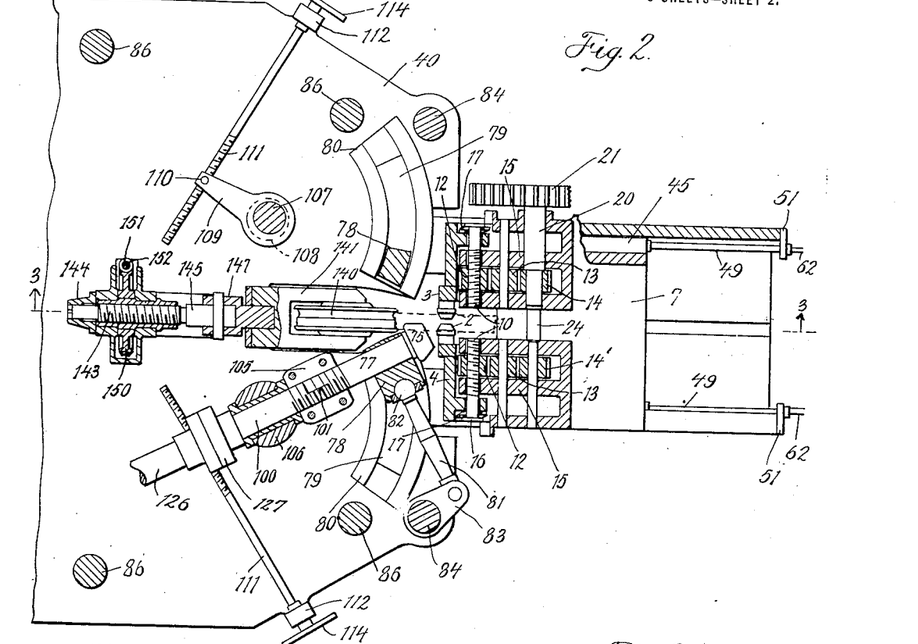
Fig. 2 is a horizontal section thereof, the view being taken on the line 2—2 of Fig. 3.

As previously stated each web roll shaft is divided longitudinally into a series of sections the forward portions of which are numbered 77. The forward section of each shaft connects to the next section 100 (Fig. 2) by a rigid coupling formed by screw-threading the contacting end of each section cutting them to semi-circular cross-section and overlapping them as at 101. An interiorly screw-threaded split sleeve 105 is then clamped upon these threaded ends.

To provide for adjustment to insure proper alinement of the web rolls each shaft section 100 is mounted in a bearing 106 on the main base 40, this bearing being fixed on a vertical stud 107 which rests in an eccentric boring in a sleeve 108 rotatable in the main base 40 and having an integral arm 109 to which is pivoted a nut 110 through which is threaded a screw 111 swiveled in a lug 112 on the side of the main base 40 and having a handwheel 114 for turning.

The rear section of each shaft is numbered 120 and is mounted in bearings 121 on the base 40, and having fixed on its rear end a bevel gear 122 meshing with a second gear 123 fixed on a shaft 124 rotated by an electric motor 125. To permit of the lateral movement of the shaft by the eccentric just described a fourth shaft section 126 is interposed between the shaft sections 100 and 120 and is connected thereto by the universal joints, 127 and 128 respectively, of any suitable construction.

Figure 3:
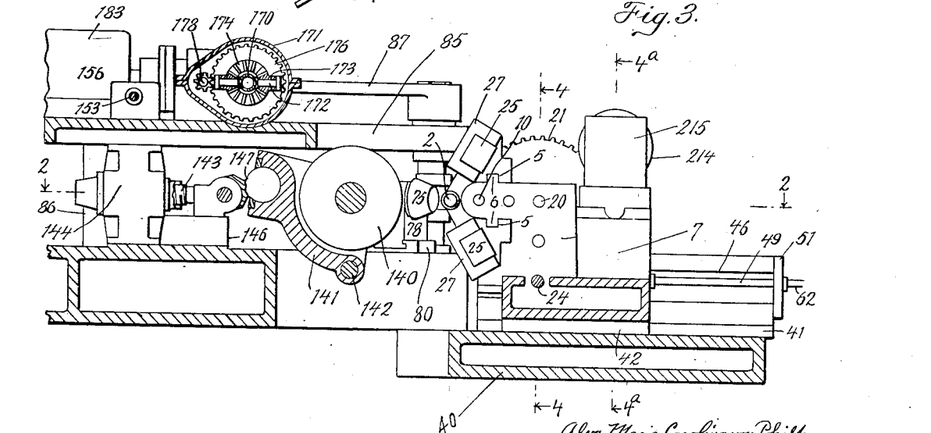
Fig. 3 is a longitudinal vertical section taken on the line 3—3 of Fig. 2.

The tread roll is shown at 140 (Figs. 2 and 3) and is located just to the rear of the web rolls with its axis in a common horizontal plane with the web rolls and center supports 2. This tread roll is mounted to rotate freely in a cradle 141 pivoted on its underside as at 142 to the main base 40. The cradle 141 is swung forward on its pivot, thus advancing the roll, by means of a screw 143 longitudinally but non-rotatably movable in a bracket 144 and fixed at its forward end to a block 145 slidable in a guide 146 on the base 40. A thrust link 147 is pivotally connected at opposite ends to the block 145 and the cradle 141.

Figures 12, 13, 14:
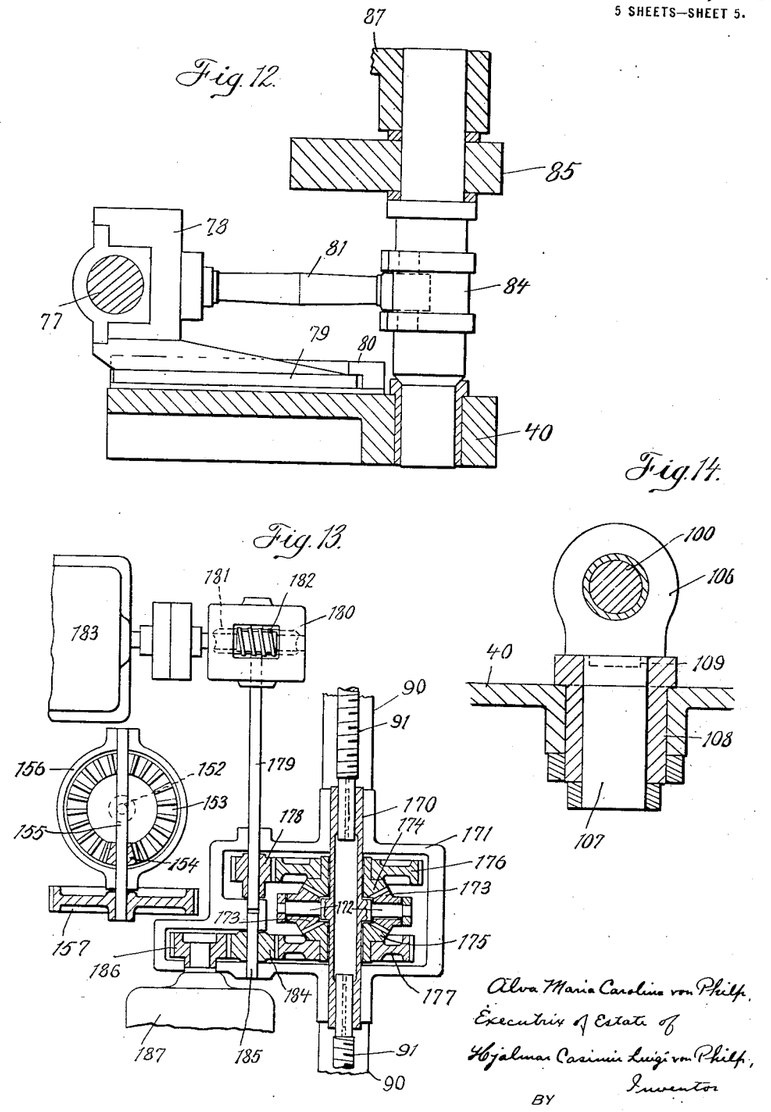
Fig. 12 is a detail sectional view of the web roll feeding means.
Fig. 13 is a horizontal sectional view of the web roll and tread roll driving means.
Fig. 14 is a detail vertical section of the eccentric for adjusting the web roll.

The screw 143 is caused to travel by a worm gear 150 through which the screw is threaded and which is localized by adjacent parts of the bracket 144 which also supports a worm pinion 151 on the lower end of a shaft 152 whose upper end projects through the top plate 85 and has fixed thereon a bevel gear 153 (Fig. 13). Meshing with this bevel gear is a bevel pinion 154 fixed on a horizontal shaft 155 supported in a bearing 156 on the top plate. Fixed to the end of shaft 155 is a gear 157 which meshes with a pinion 158 (Fig. 1) on the shaft of an electric motor 159 carried by the top plate.

Referring now to the driving mechanism (Fig. 13) for the screws 91 before referred to which move the web rolls toward each other. The inner end of each screw is unthreaded and projects into one end of a sleeve 170 with which it has axially movable but non-rotative connection. The sleeve is mounted in a suitable bearing 171 on the top plate and is formed midway between its ends with a pair of integral studs 172 projecting therefrom. These studs 172 have bevel pinions 173 rotatable thereon, these pinions each meshing with a pair of oppositely facing bevel gears 174 and 175 loose upon the sleeve 170 and having fixed thereto the spur gears 176 and 177. The gear 176 meshes with a pinion 178 fixed on a horizontal shaft 179 bearing at one end in the casing 171 and at its opposite end in a second casing 180 also mounted on the top plate. The last mentioned end of the shaft 179 has fixed thereto a worm gear 181 meshing with a worm pinion 182 on the shaft of an electric motor 183 mounted on the top plate.

The gear 177 meshes with an idler pinion 184 fixed on a short shaft 185 carried by the casing 171 in alinement with the shaft 179. The pinion 184 meshes also with a gear 186 fixed on the shaft of an electric motor 187 on the top plate. The shaft of this motor is also connected to a magnetic brake 188 (Fig. 1). This magnetic brake may be of well known construction, such as shown in Patent No. 795,207 issued July 18, 1905.

The mechanism for rotating the screws which drive the carriages 4 is substantially the same as that for rotating the screws 141. The gear 21 before mentioned meshes with a pinion 200 (Fig. 4) fixed on a shaft 201 journaled in the base carriage 7 and having integral studs 202 on which are pivoted bevel pinions 203 meshing with bevel gears 204 and 205 loose on shaft 201. The gear 204 has rigid therewith a worm gear 205 meshing with a worm pinion 206 on the upper end of a vertical shaft 207 to whose lower end is fixed a bevel gear 208 meshing with a bevel gear 209 on the shaft of an electric motor 210 carried by the carriage 7.

The gear 205 has fixed thereto a spur gear 211 meshing with an idler 212 which meshes with another gear 213 driven by a motor 214 on the carriage 7 and to which is connected a magnetic brake 215 similar to the brake 188.

The operation is as follows: The wheel blank is lowered by any suitable means between the pins 2 and the motor 210 is started. Motion is transmitted from the motor to the shaft 201 through the bevel gears 208, and 209, shaft 207, worm pinion 206, worm gear 205, bevel gear 204, and bevel pinions 203. The gear 211 is held stationary by the brake 215 and in consequence the pinions 203 move bodily, rotating shaft 201 at half the speed of bevel gear 204. Pinion 200 is also fixed to shaft 201 and rotates gear 21 on shaft 20 which is connected by the gears 12, 13 and 14 with the screws 10, the threaded connections between the screws 10 and gears 12 causing the screws to move longitudinally and advance the carriages 4 toward one another.

When the pins 2 have engaged and supported the blank the base carriage 7 is then advanced to bring the blank into proper relation to the tread and web rolls. This is done by opening the valve 55 which controls the cylinders 47 allowing water to enter the latter through the hollow pistons 49. The tread roll is started rotating and the web rolls started rotating and feeding inwardly. The web rolls are fed inwardly by motor 183 which acts on the shaft 91, through worm pinion 182, worm gear 181, shaft 179, pinion 178, gear 176, bevel gear 174, bevel pinions 173 and sleeve 170, bevel gear 175 being held against movement by the magnetic brake 188 acting through the gears 186, 184, and 177. The rotation of screws 91, moves the carriages 89 therealong, causing arms 87 to swing and rock shafts 84, whose arms 83, cause the links 81 to move the bearings 78 in the slides 80. The brake 188 is set to a certain pressure and if a resistance greater than such pressure is encountered the motor 187 will be started and because of its different gear ratio connection with sleeve 170 will cause a backward rotation to shafts 91 until the strain is released.

The springs 92 also provide for relief in the event of a high spot or other obstruction being encountered as they allow the shafts 91 to shift bodily inwardly.

The tread roll 140 is advanced by motor 159 acting through spur pinion and gear 158, 157, bevel pinion and gear 154, 153, shaft 152, worm pinion and gear 151, 150, the latter acting on screw 143 to move the latter longitudinally.

During this operation the feed of the carriages 4 is continued to cause the rolls 25 to act on the rim of the blank. A relief connection similar to that of the web rolls is also provided by the magnetic brake 215 which causes an operation of motor 214 to give a reverse rotation of shaft 201, through gears 211, 212 and 213, in the event of unusual resistance being encountered. The spring washers 17 also act similarly on the screws 10 as the springs 92 on the screws 91.

As the blank enlarges in diameter the carriage 7 is moved backward by the blank, the liquid in cylinders 47 exhausting through pipes 62, passages 63 and 64 of valve casing 52 and through the exhaust passages 66 controlled by the spring pressed valve 67. When the forming operation is complete the motors 187 and 214 are started causing the web rolls and carriages 4 to draw apart, acting through the connections previously described.

Should it be desired to adjust the alinement of the web rolls 75 the eccentric bushings 108 may be adjusted by means of the arms 109, screws 111 and wheels 114.

As many changes could be made in the above construction and many apparently widely different embodiments of my invention designed without departing from the scope of the appended claims, I intend that all matter contained in the above description or shown in the accompanying drawings shall be interpreted as illustrative merely of an operative embodiment of my invention and not in a limiting sense.

What I claim is:—

1. In a wheel rolling mill, a forming roll, a shaft made up of a pair of sections connected by a universal joint, one of said sections having said roll mounted thereon, a bearing in which said roll holding section of the shaft is mounted, a vertical stud on which said bearing is fixed, a sleeve having an eccentric boring in which said stud rests, and means for imparting rotary motion to said sleeve.

2. In a wheel rolling mill, a forming roll, a shaft made up of a pair of sections connected by a universal joint, one of said sections having said roll mounted thereon, a bearing in which said roll holding section of the shaft is mounted, a vertical stud on which said bearing is fixed, a sleeve having an eccentric boring in which said stud rests, and means for imparting rotary motion to said sleeve, said means comprising an arm on said sleeve, a nut on said arm and a swiveled screw engaging said nut.

3. In a rolling mill, means for holding and rotating a wheel blank, devices adapted to act simultaneously on the web and on the sides and tread of the rim of the blank to shape the same, and means adapted to impart relatively slow advancing and fast receding movements to said devices.

4. In a rolling mill, means for holding a blank to be shaped, means adapted to act upon said blank to shape it, means whereby relatively slow and fast advancing and receding movements may be imparted to said last mentioned means, and means whereby the blank shaping means will be caused to automatically recede upon undue increase of strain thereon.

5. In a rolling mill, means for holding a blank to be shaped, a device adapted to act upon said blank to shape it, means for imparting a relatively slow advancing movement to said device, means for imparting a relatively fast receding movement to said device, and means for causing the said device to be automatically actuated by the last mentioned means upon undue increase of strain thereon during advancing movement.

6. In a rolling mill, means for holding a blank to be shaped, a device adapted to act upon said blank to shape it, means for causing said device to advance, means for causing said device to recede, and means for causing the said device to be automatically actuated by the last mentioned means upon undue increase of strain thereon during advancing movement.

7. In a wheel rolling mill, a pair of studs adapted to have a wheel blank centered thereon, a pair of rollers adapted to engage and shape the rim of said blank, a pair of carriages supporting said studs and rollers, each carriage supporting a stud and a roller, and means for adjusting said carriages.

8. In a wheel rolling mill, a pair of studs adapted to have a wheel blank centered thereon, a pair of rollers adapted to engage and shape the rim of said blank, a pair of carriages supporting said studs and rollers, each carriage supporting a stud and a roller, and means for adjusting said carriages in unison toward and way from said blank.

9. In a wheel rolling mill, a pair of studs adapted to have a wheel blank centered thereon, a pair of rollers adapted to engage and shape the rim of said blank, a pair of carriages supporting said studs and rollers, each carriage supporting a stud and a roller, and means for adjusting said carriages, said means including a differential gearing.

10. In a wheel rolling mill, a device adapted to act upon a blank to shape it, means for advancing said device relatively slowly, means for retracting said device relatively quickly, and an operative connection between said devices whereby operation of the last mentioned means neutralizes the advancing action of the first mentioned means upon the said device.

11. In a wheel rolling mill, a device adapted to act upon a blank to shape it, means for advancing said device relatively slowly, means for retracting said device relatively quickly, and an operative connection between said devices whereby operation of the last mentioned means neutralizes the advancing action of the first mentioned means upon the said device, said means including a pair of opposed bevel gears, a shaft upon which said gears are freely mounted and a bevel pinion loosely carried on a radial offset from said shaft and engaging each of said gears.

12. In a wheel rolling mill, a device adapted to hold a blank, a base carriage on which said device is mounted, a device adapted to act upon the blank to shape it, means for advancing said base carriage toward the blank shaping device, and means yieldingly holding said base carriage against movement away from said blank shaping device.

13. In a wheel rolling mill, a device adapted to hold a blank, a base carriage on which said device is mounted, a device adapted to act upon the blank to shape it, fluid operated means for advancing said base carriage toward the blank shaping device, and means comprising a spring pressed escape valve for the fluid for yieldingly holding said base carriage against movement away from said blank shaping device.

14. In a wheel rolling mill, a device adapted to hold a blank, a base carriage on which said device is mounted, a bed plate on which said base carriage is slidably supported, a blank shaping device, a cylinder fixed to said carriage, a plunger fixed to said bed plate and extending into said cylinder, and means for supplying fluid under pressure into said cylinder.

15. In a wheel rolling mill, a device adapted to hold a blank, a base carriage on which said device is mounted, a bed plate on which said base carriage is slidably supported, a blank shaping device, a cylinder fixed to said carriage, a plunger fixed to said bed plate and extending into said cylinder, means for supplying fluid under pressure into said cylinder and yielding means permitting the exhaust from said cylinder under pressure.

16. In a wheel rolling mill, a device adapted to hold a blank, a base carriage upon which said device is mounted, a bed plate on which said base carriage is slidably supported, a blank shaping device, a pair of opposed cylinders fixed to said base carriage, a pair of plungers each fixed at one end to said bed plate and extending from opposite directions into said cylinders, and means for supplying fluid under pressure to said cylinders.

17. In a wheel rolling mill, a forming roll, a universally jointed shaft on which said roll is fixed, means for rotating said shaft, a threaded shaft, a carriage in operative engagement therewith, an operative connection between said carriage and jointed shaft, means for rotating said threaded shaft, and means yieldingly holding said threaded shaft against longitudinal displacement, for the purpose set forth.

Signed at Bethlehem, Penn., this 21st day of January, 1919.

ALVA MARIA CAROLINA von PHILP,
*Administratrix of Hjalmar Casimir Luigi von Philip, deceased.*